United States Patent
Sakuma et al.

(10) Patent No.: US 12,153,912 B2
(45) Date of Patent: Nov. 26, 2024

(54) UPGRADING OPERATING SOFTWARE ("OS") FOR DEVICES IN A MULTI-DEVICE ECOSYSTEM

(71) Applicant: INTERNATIONAL BUSINESS MACHINES CORPORATION, Armonk, NY (US)

(72) Inventors: Katsuyuki Sakuma, Fishkill, NY (US); Sarbajit K Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 60 days.

(21) Appl. No.: 17/456,782

(22) Filed: Nov. 29, 2021

(65) Prior Publication Data
US 2023/0168877 A1  Jun. 1, 2023

(51) Int. Cl.
| | |
|---|---|
| *G06F 8/65* | (2018.01) |
| *G06F 8/10* | (2018.01) |
| *G06F 9/4401* | (2018.01) |
| *G06F 9/50* | (2006.01) |
| *G06N 20/00* | (2019.01) |

(52) U.S. Cl.
CPC .................. *G06F 8/65* (2013.01); *G06F 8/10* (2013.01); *G06F 9/4401* (2013.01); *G06F 9/505* (2013.01); *G06N 20/00* (2019.01); *G06F 2209/5021* (2013.01)

(58) Field of Classification Search
CPC ....................................................... G06F 8/65
See application file for complete search history.

(56) References Cited

U.S. PATENT DOCUMENTS

| | | | |
|---|---|---|---|
| 10,228,931 B2 | 3/2019 | Singh et al. | |
| 10,771,332 B2 | 9/2020 | Mahajan et al. | |
| 2001/0029178 A1* | 10/2001 | Criss | G06F 8/65 455/418 |
| 2005/0055595 A1* | 3/2005 | Frazer | G06F 8/654 713/400 |
| 2005/0132150 A1* | 6/2005 | Jewell | G06F 11/1441 713/340 |
| 2006/0112427 A1* | 5/2006 | Shahbazi | H04W 12/086 726/16 |
| 2006/0218545 A1* | 9/2006 | Taguchi | G06F 8/656 717/171 |

(Continued)

OTHER PUBLICATIONS

Albayram et al., "Sensor Networks to Monitor Elderly", SlideServe.com, Presentation, Accessed Dec. 1, 2023, 9 pages.

(Continued)

*Primary Examiner* — Jae U Jeon
(74) *Attorney, Agent, or Firm* — Steven M. Bouknight

(57) ABSTRACT

Embodiments are provided for upgrading operating application in a multi-device ecosystem in a computing environment. Various types of computing devices are determined to be connected to a multi-device computing network. A collaboration plan is generated between the computing devices to execute an operating application operation event on each of the computing devices without interrupting user activities executing on each of the computing devices. Operating applications on each of the computing devices are upgraded according to the collaboration plan without interrupting each of the f user activities on each of the computing devices.

20 Claims, 8 Drawing Sheets

(56) References Cited

U.S. PATENT DOCUMENTS

| | | | |
|---|---|---|---|
| 2015/0358810 A1 | 12/2015 | Chao et al. | |
| 2016/0274893 A1 | 9/2016 | Thomas et al. | |
| 2016/0295410 A1* | 10/2016 | Gupta | H04W 12/06 |
| 2018/0165145 A1* | 6/2018 | Mielke | G06F 11/0745 |
| 2021/0081189 A1* | 3/2021 | Nucci | H04L 41/20 |
| 2021/0304215 A1* | 9/2021 | Balakrishnan | H04M 15/66 |
| 2022/0126102 A1* | 4/2022 | Brouns | A61N 1/37282 |

OTHER PUBLICATIONS

Bremond et al., "Multi-sensors Analysis for Everyday Elderly Activity Monitoring", GER'HOME Project, Accessed on Dec. 1, 2023, 4 pages.

Mishra et al., "Rise of Wearables and future of Wearable Technology", Medium. com, Accessed on Dec. 1, 2023, 9 pages.

Mohmed et al., "Clustering-Based Fuzzy Finite State Machine for Human Activity Recognition", Contributions Presented at the 18th UK Workshop on Computational Intelligence, Sep. 5-7, 2018, 13 pages.

* cited by examiner

UPGRADING OPERATING SOFTWARE ("OS") FOR DEVICES IN A MULTI-DEVICE ECOSYSTEM

BACKGROUND OF THE INVENTION

Field of the Invention

The present invention relates in general to computing systems, and more particularly, to various embodiments for upgrading operating software ("OS") for devices in a multi-device ecosystem by a processor.

Description of the Related Art

In today's society, consumers, businesspersons, educators, and others communicate over a wide variety of mediums in real time, across great distances, and many times without boundaries or borders. The advent of computers and networking technologies have made possible the intercommunication of people from one side of the world to the other. Smartphones and other sophisticated devices allow for the sharing of information between users in an increasingly user friendly and simple manner. The increasing complexity of society, coupled with the evolution of technology continue to engender the sharing of a vast amount of information between people.

SUMMARY OF THE INVENTION

Various embodiments for upgrading an operating application in a multi-device ecosystem in a computing environment by a processor are provided. In one embodiment, by way of example only, a method for upgrading operating application in a multi-device ecosystem, again by a processor, is provided. A number of computing devices are determined to be connected to a multi-device computing network. A collaboration plan is generated between the computing devices to execute an operating application operation event on each of the computing devices without interrupting user activities executing on each of the computing devices. Operating applications on each of the computing devices are upgraded according to the collaboration plan without interrupting each of the f user activities on each of the computing devices.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

Thus, in addition to the foregoing exemplary method embodiments, other exemplary system and computer product embodiments are provided

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
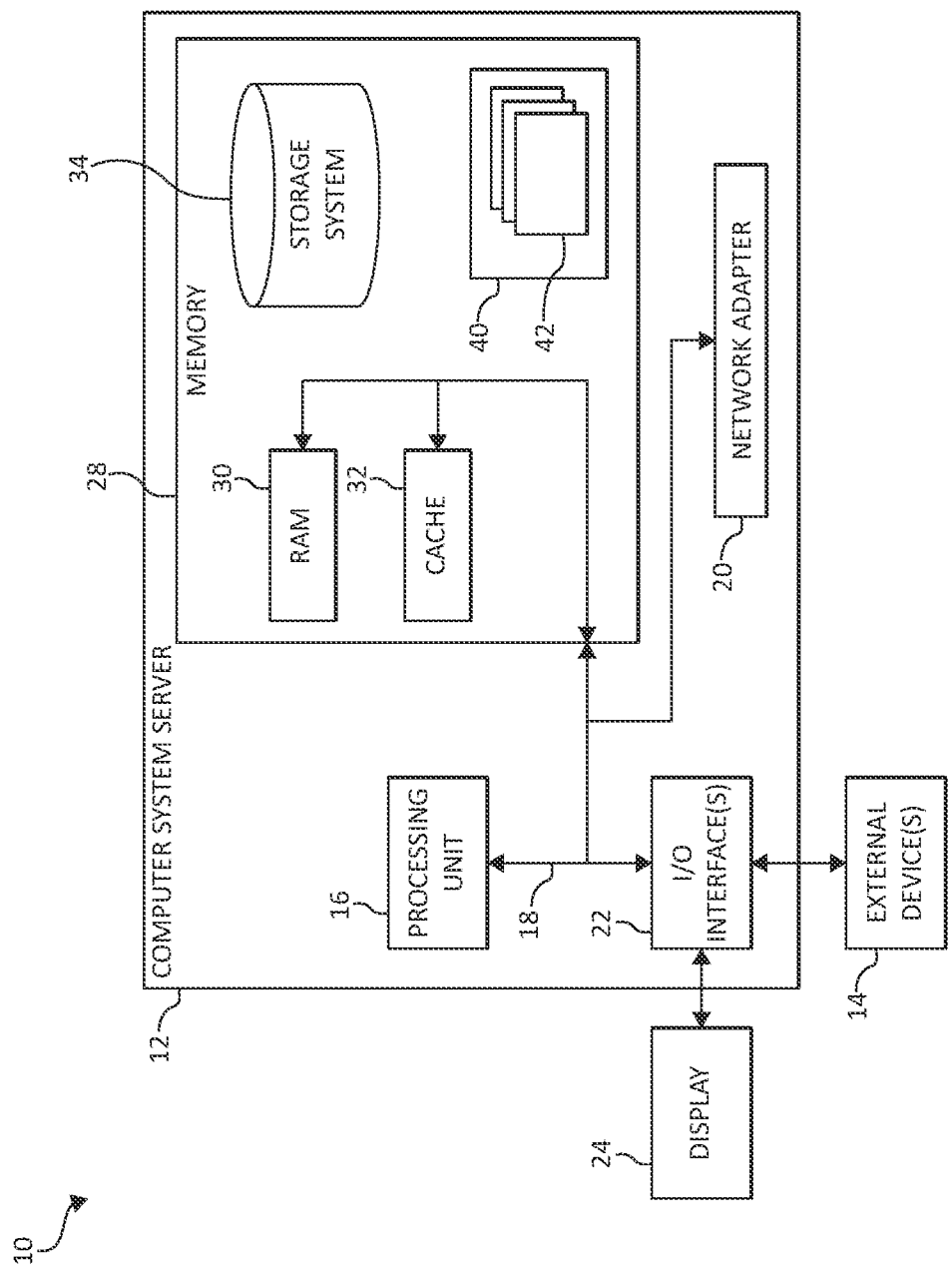
FIG. 1 is a block diagram depicting an exemplary cloud computing node according to an embodiment of the present invention.

As a preliminary matter, computing systems may include large scale computing called "cloud computing," in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

Additionally, the Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Many of these objects are devices that are independently operable, but they may also be paired with a control system or alternatively a distributed control system such as one running over a cloud computing environment. Additionally, different computing devices are having different capabilities such as, for example, a smartwatch can display time, video content, and capture biometric information. Alternatively, some other computing devices may be augment reality ("AR") glasses wearable on the head that may be able to change optical properties at runtime and/or reflect a projected digital image and/or enhance targeted images.

With the increased uses of various types of computing devices (aka "user equipment") such as, for example, wireless communication devices (e.g., IoT devices, smartphones, tablets, computers), each of these computing devices may enhance and improve various aspects of a user's daily activities and schedules. However, it can be very difficult to manage a user's complicated schedule and activities such as, for example, calendared and non-calendared scheduled events.

Further complicating matters, each of these computing devices may include operating software ("OS") (e.g., an operation application or "application) that may need to be updated, modified, or enhanced. For example, an upgrade may be required with different patches. Some OS versions are also upgraded in different devices such as, for example, by a mobile device performing an online OS upgrade. Thus, when an OS is to be upgraded or patch is to be installed, there will be a "downtime" (e.g., the device is unavailable for use) in the device, and during that upgradation timeline, the said device may be inaccessible for use. After upgradation is completed, then user may also need to configure the newly added features. This downtime further complicates matters when the devices is in a multi-device ecosystem in a computing environment.

Accordingly, various embodiments are provided herein to provide a novel solution for upgrading an operating application (e.g., an "OS") in a multi-device ecosystem. A number of computing devices such as, for example, one or more IoT computing devices, are determined to be connected to a multi-device computing network such as, for example, a multi-device computing network in a cloud computing environment. A collaboration plan is generated between the computing devices to execute an operating application operation event on each of the computing devices without interrupting user activities executing on each of the computing devices. Operating applications on each of the computing devices are upgraded according to the collaboration plan without interrupting each of the f user activities on each of the computing devices.

In some implementations, the computing devices in the multi-device ecosystem may determine on their own how the devices can be upgraded, so that user's activity will not be hampered, but each of the devices will also collaborate with each other devices to identify a sequence of opportunities for upgrading each of the operating systems of the each of the computing devices among the devices so that a user is able to continue with the user's daily activities with experiences any downtime or interruption to the daily activities.

In other implementations, the computing devices in the multi-device ecosystem may perform various operations, functions, or processes in relation to an intended purpose of a user. For example, a smart phone device may be used to both initiate communication with a third party while also monitoring a heart rate. Thus, the computing devices in the multi-device ecosystem may learn ne or more relationships, dependencies, or life situations, that can be defined, learned, or determined between these various activities and responsibilities across one or more computing devices in the multi-device ecosystem. Also, one or more actions taken or performed on the computing devices may be used to collaborate the scheduling of upgrading each of the operating systems for each of the computing devices.

The present invention provides for a computing system to learn and understand a user's (e.g., members) role within one-to-many groups and understanding a number of life's events (e.g., activities of daily living "ADL" that happen daily and that may or may not be scheduled on a calendar). The computing system may learn one or more choices, options, events/sub-events, solutions, or a combination thereof throughout a person's day as they relate to usage of each of the different the computing devices in the multi-device ecosystem. Given that decision options may be constantly changing temporally as one or more events (e.g., ADL events), the present invention provides the computing system that can learn, determine, and/or manage life's daily events, analyze all options available to achieve optimal success for life's events, and propose schedules or ranking of times for when each of the computing devices in the multi-device ecosystem should or should not upgrade the operating software of the computing device. The computing system that can learn, determine, and/or manage one or more actions during a selected time period to achieve a preferred, optimized, selected daily outcome for upgrading operating software ("OS") for devices in a multi-device ecosystem.

The so-called "optimization" of scheduling or predicting times for each of the computing devices to upgrade one or more operating applications may include learning options, ADLs, activities, outcomes such as a scheduled or predicted upgrade times, may be very subjective and context dependent particularly between one or more groups. Optimization may be defined as an act, process, or operation of making the best or most effective use of a situation, resource, events/sub-events, options, ADLs, activities, outcomes, or a combination thereof for upgrading operating software ("OS") for devices in a multi-device ecosystem. Optimization may be the maximization or minimization of a quantity or a combination of quantities, a maximum of an objective function. Also, optimization may be defined as learning, identifying, determining, and/or finding a best configuration for intelligent upgrading operating application for devices in a multi-device ecosystem. Accordingly, the so-called "optimization" of may depend greatly upon contextual factors, such as a one-to-many user/device relationships, and other contextual factors such as, for example, the resources, events/sub-events, options, ADLs, activities, outcomes, and/or user experiences and device purposes.

Moreover, as used herein, ADLs may refer to the most common activities that people perform during a day. For example, activities of daily living may include many activities that take place throughout the day, particularly going to work, child-care, elderly care, health management, communication management, financial management, safety/emergency responses, shopping, visiting friends or family, traveling, housekeeping, grooming or personal hygiene practices, meal preparation/dining out, engaging in social media, and even using a computer. ADLs may also be used in terms of healthcare to refer to the person's daily self-care activities. The context of daily living ("CDL" or "CDLs") may refer to the context in which one or more ADLs are executed or carried out. The CDL may also include one or more dimensions such as, for example, time, location, environment conditions, weather conditions, traffic conditions, and the like. A domain knowledge may provide one or more correlations or relationships between a person's health state and the ADLs and CDLs.

Some ADLs may also be applicable for one or more types of specific events. For example, a person having experienced a recent surgical procedure may require different or altered ADLs for treatment, recovery, or even resuming previously enjoyed ADLs. Each organism (e.g., person) may have different ADLs than other persons. Accordingly, the ADLs for each person may be learned, identified, and analyzed. In one aspect, the ADLs for a person may be learned such as, for example, using machine learning or using a domain knowledge relating to information about the person's activities and behaviors, which may be stored in a patient profile.

It should be noted as described herein, the term "intelligent" (or "cognitive/cognition") may be relating to, being, or involving conscious intellectual activity such as, for example, thinking, reasoning, or remembering, that may be performed using a machine learning. In an additional aspect, cognitive or "intelligent may be the mental process of knowing, including aspects such as awareness, perception, reasoning and judgment. A machine learning system may use artificial reasoning to interpret data from one or more data sources (e.g., sensor-based devices or other computing systems) and learn topics, concepts, and/or processes that may be determined and/or derived by machine learning.

In an additional aspect, cognitive or "intelligent" may refer to a mental action or process of acquiring knowledge and understanding through thought, experience, and one or more senses using machine learning (which may include using sensor-based devices or other computing systems that include audio or video devices). Cognitive/intelligent may also refer to identifying patterns of behavior, leading to a "learning" of one or more events, operations, or processes. Thus, the intelligent model may, over time, develop semantic labels to apply to observed behavior and use a knowledge domain or ontology to store the learned observed behavior. In one embodiment, the system provides for progressive levels of complexity in what may be learned from the one or more events, operations, or processes.

In an additional aspect, the term intelligent may refer to an intelligent system. The intelligent system may be a specialized computer system, or set of computer systems, configured with hardware and/or software logic (in combination with hardware logic upon which the software executes) to emulate human cognitive functions. These intelligent systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. An intelligent system may perform one or more computer-implemented intelligent operations that approximate a human thought process while enabling a user or a computing system to interact in a more natural manner. An intelligent system may use AI logic, such as NLP based logic, for example, and machine learning logic, which may be provided as specialized hardware, software executed on hardware, or any combination of specialized hardware and software executed on hardware. The logic of the intelligent system may implement the intelligent operation(s), examples of which include, but are not limited to, question answering, identification of related concepts within different portions of content in a corpus, and intelligent search algorithms, such as Internet web page searches.

In general, such intelligent systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and intelligent; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human intelligent based on experiences.

In an additional aspect, a machine learning model may include a knowledge domain that may be used and may include an ontology of concepts representing a domain of knowledge. A thesaurus or ontology may be used as the domain knowledge and may also be used to associate various characteristics, attributes, symptoms, behaviors, sensitivities, parameters, user profiles, computing device profiles, group profiles, and/or relationships and/or responsibilities between one or more users and/or computing devices. In one aspect, the term "domain" is a term intended to have its ordinary meaning. In addition, the term "domain" may include an area of expertise for a system or a collection of materials, information, content and/or other resources related to a particular subject or subjects.

The term ontology is also a term intended to have its ordinary meaning. In one aspect, the term ontology in its broadest sense may include anything that can be modeled as ontology, including but not limited to, taxonomies, thesauri, vocabularies, and the like. For example, an ontology may include information or content relevant to a domain of interest or content of a particular class or concept. The ontology can be continuously updated with the information synchronized with the sources, adding information from the sources to the ontology as models, attributes of models, or associations between models within the ontology.

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
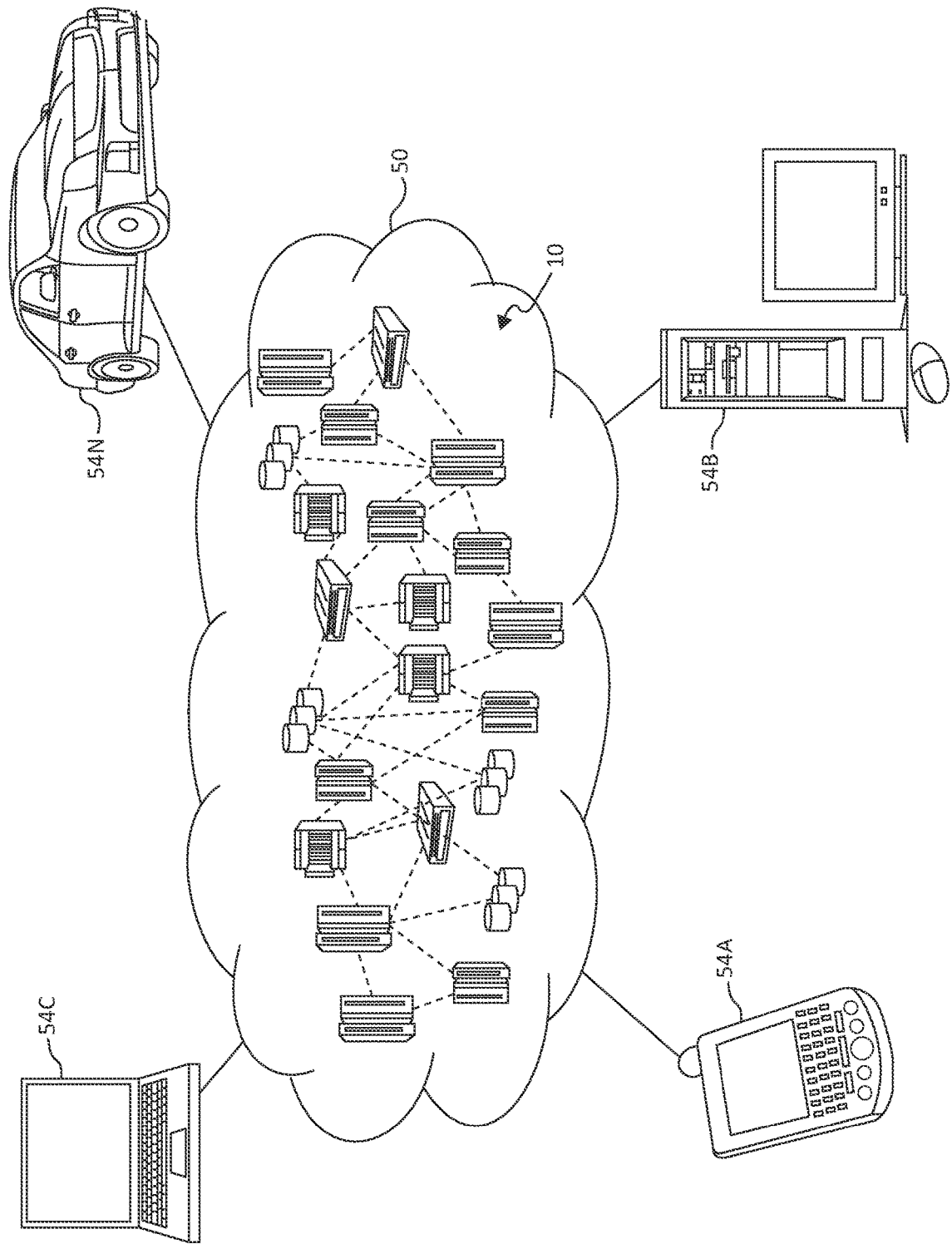
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
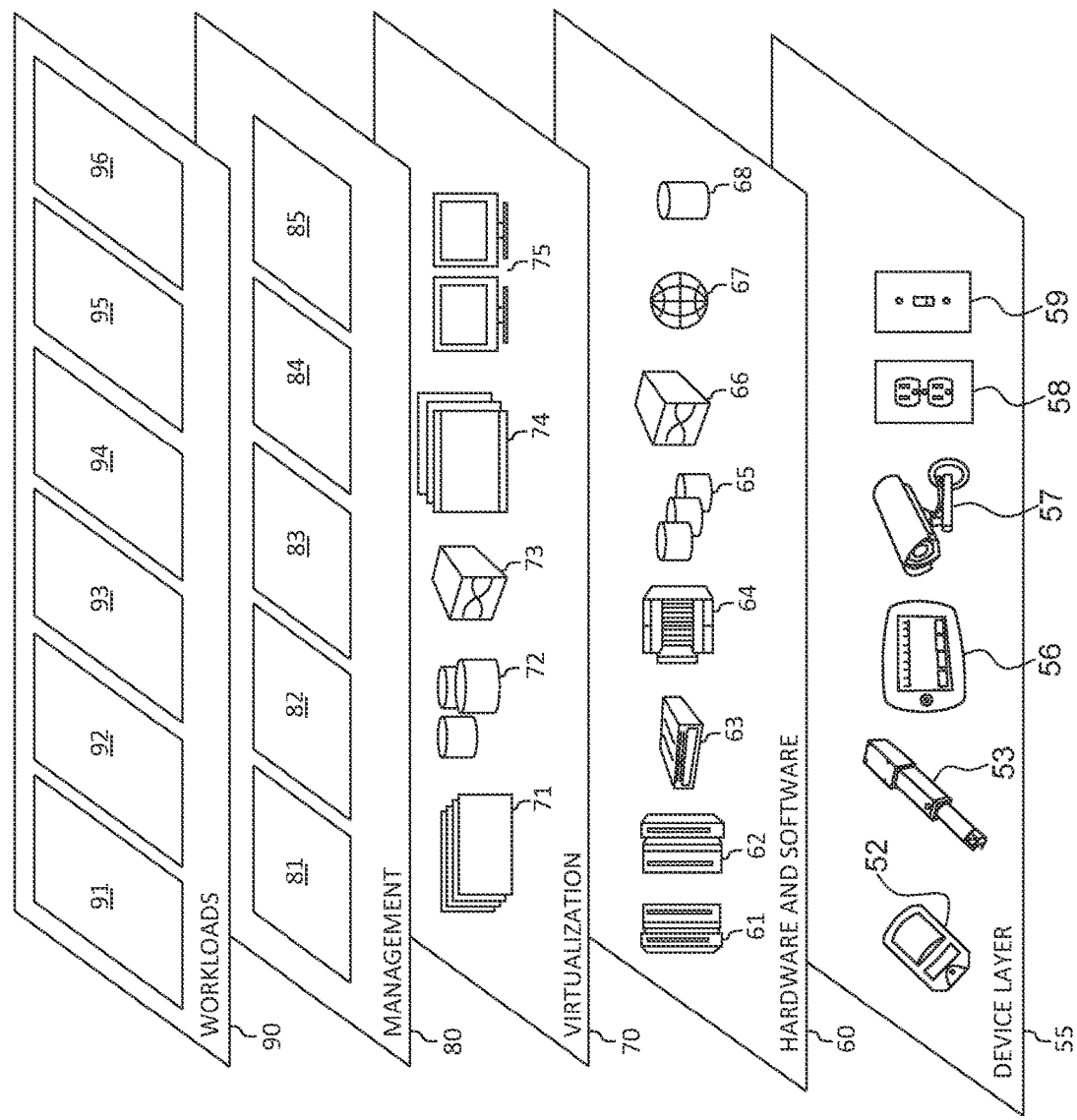
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for intelligent upgrading operating applications for devices. In addition, workloads and functions 96 for intelligent upgrading operating applications for devices may include such operations as data analytics, data analysis, data collaboration, and as will be further described, notification functionality. One of ordinary skill in the art will appreciate that the workloads and functions 96 for intelligent upgrading operating applications for devices may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide novel approaches for the optimizing, collaborating, and upgrading operating applications for each computing device in a multi-device ecosystem. A number of computing devices are determined to be connected to a multi-device computing network. A collaboration plan is generated between the computing devices to execute an operating application operation event on each of the computing devices without interrupting user activities executing on each of the computing devices. Operating applications on each of the computing devices are upgraded according to the collaboration plan without interrupting each of the f user activities on each of the computing devices.

In addition, the present invention provides for dynamically collaborating and learning the context of a user for prioritizing the upgrading operations such as, for example, automatically upgrading operations each device among the group computing devices.

Figure 4:
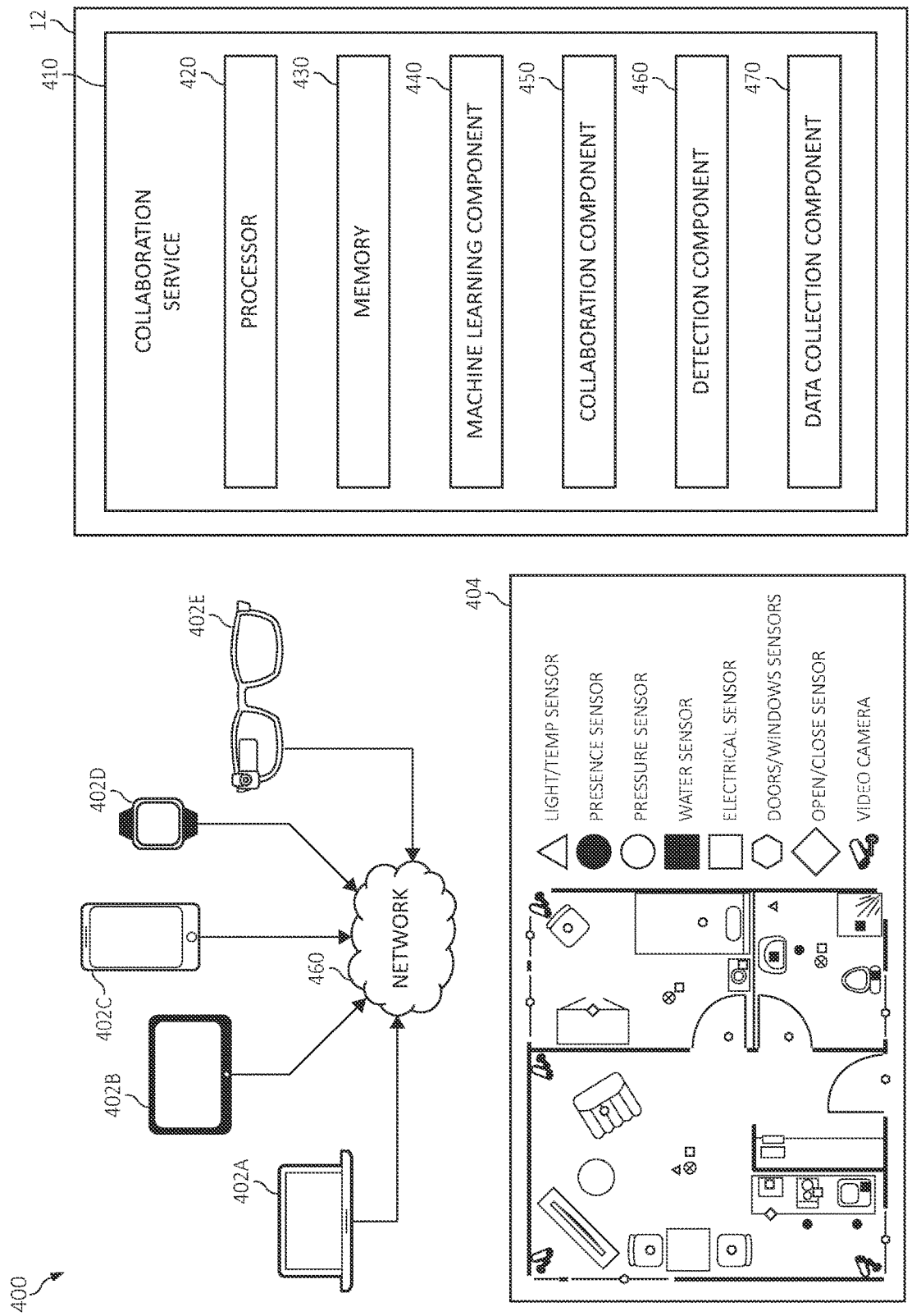
FIG. 4 is block diagram depicting an exemplary functional relationship between various aspects of the present invention.

Turning now to FIG. 4, a block diagram depicting exemplary functional components of system 400 for upgrading operating software ("OS") for devices in a computing environment according to various mechanisms of the illustrated embodiments is shown. In one aspect, one or more of the components, modules, services, applications, and/or functions described in FIGS. 1-3 may be used in FIG. 4. As will be seen, many of the functional blocks may also be considered "modules" or "components" of functionality, in the same descriptive sense as has been previously described in FIGS. 1-3.

A collaboration service 410 is shown, incorporating processing unit 420 ("processor") to perform various computational, data processing and other functionality in accordance with various aspects of the present invention. In one aspect, the processor 420 and memory 430 may be internal and/or external to the collaboration service 410, and internal and/or external to the computing system/server 12. The processing unit 420 may be in communication with the memory 430. The collaboration service 410 may be included and/or external to the computer system/server 12, as described in FIG. 1. In some implementations, the collaboration service 410 may include a machine learning component 440, a collaboration component 450, a detection component 460, and a data collection component 470.

In some implementations, the computer system/server 12 of FIG. 1 may be used in association with FIG. 4 and may be connected to other computing nodes and/or one or more Internet of Things (IoT) devices over a distributed computing network 460, where additional data collection, processing, analytics, and other functionality may be realized.

The computer system/server 12 of FIG. 1, may include functional components of the collaboration service 410 in order to collect, analyze, and process text data, images, video data, audio data, sensor data, or a combination thereof collected from the various computing devices and/or sensors. With the foregoing in mind, the module/component blocks of system 400 may also be incorporated into various hardware and software components of a system for intelligent upgrading operating applications for devices in accordance with the present invention. Many of the functional blocks 400 may execute as background processes on various components, either in distributed computing components, or on the user device, or elsewhere.

In some implementations, the system 400 may provide virtualized computing services (i.e., virtualized computing, virtualized storage, virtualized networking, etc.). More specifically, the system 400 may provide virtualized computing, virtualized storage, virtualized networking and other virtualized services that are executing on a hardware substrate.

The system 400 may include the computing environment such as, for example, a collaboration service 410, one or more IoT devices such as, for example, IoT devices 404, and user equipment(s) ("UE") 402A-E.

In some implementations, the UEs 402A-E may be computing devices and/or IoT devices such as, for example, a computer 402A, tablet 402B, a wireless communication device (e.g., a smartphone) 402C, a smart watch 402D, smart glasses 402E (e.g., augmented reality "AR" glasses) all of which may be referred to as UE IoT devices or "UEs"), and/or another electronic device that may have one or more processors and memory (e.g., computing devices 54A-N as described in FIG. 2). The system 400, the UEs 402A-E, and the IoTs 404 may each be associated with and/or in communication with each other by one or more communication methods, such as a computing network 460.

In some implementations, the IoT devices 404 may be "sensor" based IoT devices such as, for example, light sensors, detection or "presence" sensors to identify the presence of a user or animate object, a pressure sensor, a water sensor, an electrical sensor, a door/window sensor, an open/close sensor, and/or a video camera, and/or other type of sensor that may be in and/or associated with a computing device having one or more processors and memory (e.g., computing devices 54A-N as described in FIG. 2).

Thus, the collaboration service 410 may be used in a multi-device ecosystem (e.g., system 400), where one or more computing devices (e.g., UEs 402A-E and/or IoT devices 404) need or require an OS upgrade. The collaboration service 410 is used, in the multi-device ecosystem (e.g., system 400), to create an operating application (e.g., operating software) upgradation plan amongst each of the computing devices (e.g., UEs 402A-E and/or IoT devices 404) so that there is no down-time for the user.

In some implementations, the collaboration service 410, using the machine learning component 440, the collaboration component 450, the detection component 460, the data collection component 470, or a combination thereof, may determine a plurality of computing devices connected to a multi-device computing network; generate a collaboration plan to execute an operating application operation event on each of the plurality of computing devices without interrupting each of a plurality of user activities executing on each of the plurality of computing devices; and upgrade one or more operating applications on each of the plurality of computing devices according to the collaboration plan without interrupting each of the plurality of user activities on each of the plurality of computing devices.

In some implementations, the collaboration service 410, using the machine learning component 440, the collaboration component 450, the detection component 460, the data collection component 470, or a combination thereof, may collect usage data from each of the plurality of computing devices connected to the multi-device computing network, wherein each of the plurality of computing devices are an internet of things ("IoT") devices in an IoT network.

In some implementations, the collaboration service 410, using the machine learning component 440, the collaboration component 450, the detection component 460, the data collection component 470, or a combination thereof, may identify upgrade requirements for each of the one or more operating applications on each of the plurality of computing devices.

In some implementations, the collaboration service 410, using the machine learning component 440, the collaboration component 450, the detection component 460, the data collection component 470, or a combination thereof, may predict a type of usage of each of the plurality of computing devices based on current usage and activity levels of each of the plurality of computing devices.

In some implementations, the collaboration service 410, using the machine learning component 440, the collaboration component 450, the detection component 460, the data collection component 470, or a combination thereof, may prioritize each of the one or more operating applications according to the collaboration plan; upgrade the one or more operating applications on each of the plurality of computing devices according to the prioritizing; and prevent alternative ones of the plurality of computing devices from upgrading while upgrading an operation application on a selected one of the plurality of computing devices.

In some implementations, the collaboration service 410, using the machine learning component 440, the collaboration component 450, the detection component 460, the data collection component 470, or a combination thereof, may provide access to alternative ones of the plurality of computing devices while upgrading an operation application on a selected one of the plurality of computing devices.

In some implementations, the collaboration service 410, using the machine learning component 440, the collaboration component 450, the detection component 460, the data collection component 470, or a combination thereof, may initialize a machine learning mechanism for collecting feedback information from the plurality of computing devices to assign, modify, update, or alter the one or more operating applications on each of the plurality of computing devices; learning the relationships and activities between the each of the plurality of computing devices and one or more users associated with each of the plurality of computing devices; and modifying the collaboration plan for upgrading the one or more operating applications on each of the plurality of computing devices.

In some implementations, the collaboration service 410, using the machine learning component 440, the collaboration component 450, the detection component 460, the data collection component 470, or a combination thereof, may consumed content from the UEs 402A-E and/or the IoT devices 404 and learn, identify, and process data relating to events, schedules, tasks, ADL, decisions, alternatives, criteria, subjects, topics, ideas, relationships, responsibilities, concepts, user profiles, user behavior, schedules of each of a group of members, events/sub-events, dependencies of events/sub-events, decision elements, alternatives to a decision, alternative options/choices/events, decision criteria, concepts, suggestions, underlying common activities, and/or features of the computing devices (e.g., the UEs 402A-E and/or the IoT devices 404).

In some implementations, the collaboration service 410, using the machine learning component 440, the collaboration component 450, the detection component 460, the data collection component 470, or a combination thereof, may track, identify, and associate all text data, audio and video data, sensor data, communication messages/threads, messages, transcripts, and the like of all data generated during all stages of the development or "life cycle" of the events, schedules, tasks, ADL, decisions, alternatives, criteria, subjects, topics, ideas, relationships, responsibilities, concepts, user profiles, user behavior, schedules of each of a group of members, events/sub-events, dependencies of events/sub-events, decision elements, alternatives to a decision, alternative options/choices/events, decision criteria, concepts, suggestions, underlying common activities, and/or features in relation to use of each of the computing devices (e.g., the UEs 402A-E and/or the IoT devices 404).

To further illustrate, consider the follow operations employed in the system 400 using the collaboration service 410.

In step 1), the collaboration service 410, for each of the participating computing devices (e.g., the UEs 402A-E and/or the IoT devices 404), may enable collaboration with each other device to identify appropriate sequences of OS upgrade in different computing devices (e.g., the UEs 402A-E and/or the IoT devices 404). The computing devices (e.g., the UEs 402A-E and/or the IoT devices 404) may plan and schedule for OS upgradation of an operation software for each of the participating computing devices such that a user's activity (e.g., ADL's or CDL") are not interrupted because of unavailability of any one or more computing devices (e.g., the UEs 402A-E and/or the IoT devices 404), which are being upgraded.

In step 2), the collaboration service 410, for each of the participating computing devices (e.g., the UEs 402A-E and/or the IoT devices 404), may predict a user's level of involvement in different devices (e.g., the UEs 402A-E and/or the IoT devices 404) and predict associated activities with the different devices (e.g., the UEs 402A-E and/or the IoT devices 404) before upgrading any computing devices (e.g., the UEs 402A-E and/or the IoT devices 404) in the multi-device ecosystem 400.

In step 3), the collaboration service 410, for each of the participating computing devices (e.g., the UEs 402A-E and/or the IoT devices 404), may enable sharing a pending task with other devices (e.g., the UEs 402A-E and/or the IoT devices 404), which are available, so that during down time, the user can receive, acquire, and access any desired or required information.

In step 4), the collaboration service 410, for each of the participating computing devices (e.g., the UEs 402A-E and/or the IoT devices 404), while any device is being upgraded, the other available devices (e.g., one or more of the UEs 402A-E and/or the IoT devices 404) may ensure and/or provide those of the devices (e.g., one or more of the UEs 402A-E and/or the IoT devices 404) that are being upgraded are having sufficient power and continue to provide wireless charging if additional power is required.

In step 5), the collaboration service 410, for each of the participating computing devices (e.g., the UEs 402A-E and/or the IoT devices 404), may predict a user's activities and when an OS of any one or more candidate devices (e.g., the UEs 402A-E and/or the IoT devices 404) are being upgraded, then the collaboration service 410 may ensure the user (e.g., one or more of the UEs 402A-E and/or the IoT devices 404) are unable be able to perform or force an upgrade operation on other devices to prevent complete shutdown of all other non-upgrading devices.

In step 6), the collaboration service 410, for each of the participating computing devices (e.g., the UEs 402A-E and/or the IoT devices 404), may predict the activities to be performed in any device (e.g., the UEs 402A-E and/or the IoT devices 404), which is planned to be upgraded. Also, the collaboration service 410, for each of the participating computing devices (e.g., the UEs 402A-E and/or the IoT devices 404), may ensure any required data and user interface may be replicated to the available non-upgrading devices (e.g., one or more of the UEs 402A-E and/or the IoT devices 404), so that any activities (e.g., ADL and/or CDLs) are not interrupted for the user and the user may perform the activities on each of the computing devices (e.g., the UEs 402A-E and/or the IoT devices 404) based on the upgrade collaboration plan and schedule.

In step 7), when any OS upgrade is planned in the system 400, the collaboration service 410, for each of the participating computing devices (e.g., the UEs 402A-E and/or the IoT devices 404), may access, provide, send/or receive the recommended OS upgrade plan to each of the different computing devices (e.g., the UEs 402A-E and/or the IoT devices 404) and which of the computing devices (e.g., the UEs 402A-E and/or the IoT devices 404) can cover an upgrading device (e.g., perform the activities for an unavailable device) that is now unavailable due to upgradation. In some aspects, the collaboration service 410, for each of the participating computing devices (e.g., the UEs 402A-E and/or the IoT devices 404), may also change a sequence of when the upgrades are to be executed (e.g., reschedule times when an OS is to be upgraded in one of the computing devices (e.g., the UEs 402A-E and/or the IoT devices 404) and may even recommend the revised sequence of upgrading (e.g., suggest a revised upgradation OS plan).

In step 8), the collaboration service 410, for each of the participating computing devices (e.g., the UEs 402A-E and/or the IoT devices 404), may track each of the user's engagement, calendar availability, no interaction with a digital device (e.g., no activities detected during a time when a user is eating, resting, or engaged in activities where no device is being used). The collaboration service 410 may identify a time slot when the user is not going to perform any activity, and accordingly the proposed system will be validating the available time slot with the time required to update the OS. The collaboration service 410 may identify appropriate timing when the OS can be upgraded.

In step 9), the collaboration service 410, for each of the participating computing devices (e.g., the UEs 402A-E and/or the IoT devices 404), may track the reassigning of the activities and may predict if the user's activity with the device (e.g., one of the UEs 402A-E and/or the IoT devices 404) has reduced and accordingly the proposed system will be identifying if the reassigning of the activity can create OS upgradation slot of the user.

In step 9), the collaboration service 410, for each of the participating computing devices (e.g., the UEs 402A-E and/or the IoT devices 404), may predict the activities and types of devices that are required to perform the various different activities (e.g., a smart phone is used to make a phone call is whereas a laptop is used to write content in a word processing document that requires a larger display device), and accordingly based on types of devices available, and pending activities the collaboration service 410 may identify the appropriate time slot when the OS can be upgraded on each one of the particular computing devices (e.g., UEs 402A-E and/or the IoT devices 404). While performing the OS upgrade on one of the particular computing devices (e.g., UEs 402A-E and/or the IoT devices 404), the collaboration service 410 may identify the required security parameters related to content transfer from one device (e.g., UE 402A) to another device (e.g., UE 402D), and accordingly appropriate contents will selectively be transferred.

It should be noted that the machine learning component 450, may function as a feedback component, and may be initialized for machine learning operation for collecting feedback information from one or more of the plurality computing devices (e.g., UEs 402A-E and/or the IoT devices 404) to assign, modify, update, or alter the one or more operation application upgrade operations. The machine learning component 450 may learn the relationships and responsibilities between the one or more events and the one or more users in association with the UEs 440. The machine learning component 450 may also learn an ability of each one of the plurality computing devices (e.g., UEs 402A-E and/or the IoT devices 404) to perform the one or more events or sub-events relating to the one or more events for predicting, scheduling, and/or rescheduling application upgrade operations. Additionally, the machine learning component 450 may collect and/or learn one or more user preferences, one or more events and/or sub-events, activities of daily living (ADL), tasks and/or sub-tasks, and/or other events associated with one or more of the devices for predicting, scheduling, and/or rescheduling application upgrade operations. For example, the machine learning component 450 may apply multiple combinations of factors, parameters, policies, user preferences, ADLs of the user, behavior characteristics, calendar schedules, historical data (e.g., previously optimized scheduled events), learned behavior data, learned rankings of events/activities, learned order of preferred events/activities, event and/or sub-event dependencies, user capabilities (e.g., abilities or capabilities for performing a task or event), or a combination thereof to the machine learning model for collaborating and predicting, scheduling, and/or rescheduling application upgrade operations.

In one aspect, the machine learning component 450, as described herein, may be performed using a wide variety of methods or combinations of methods, such as supervised learning (e.g., MCMC filters, Kalman filters, particle filters, etc.), unsupervised learning, temporal difference learning, reinforcement learning and so forth. That is, the machine learning modeling may learn parameters of one or more physical models. The machine learning modeling may be employed in the category of parameter estimation of state-space models, which may be completed by unsupervised learning techniques, particularly to learn the context and/or the indicators. Some non-limiting examples of supervised learning which may be used with the present technology include Kalman filters, particle filters, MCM filters, AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are within the scope of this disclosure. Also, when deploying one or more machine learning models, a computing device may be first tested in a controlled environment before being deployed in a public setting. Also, even when deployed in a public environment (e.g., external to the controlled, testing environment), the computing devices may be monitored for compliance.

Figure 5:
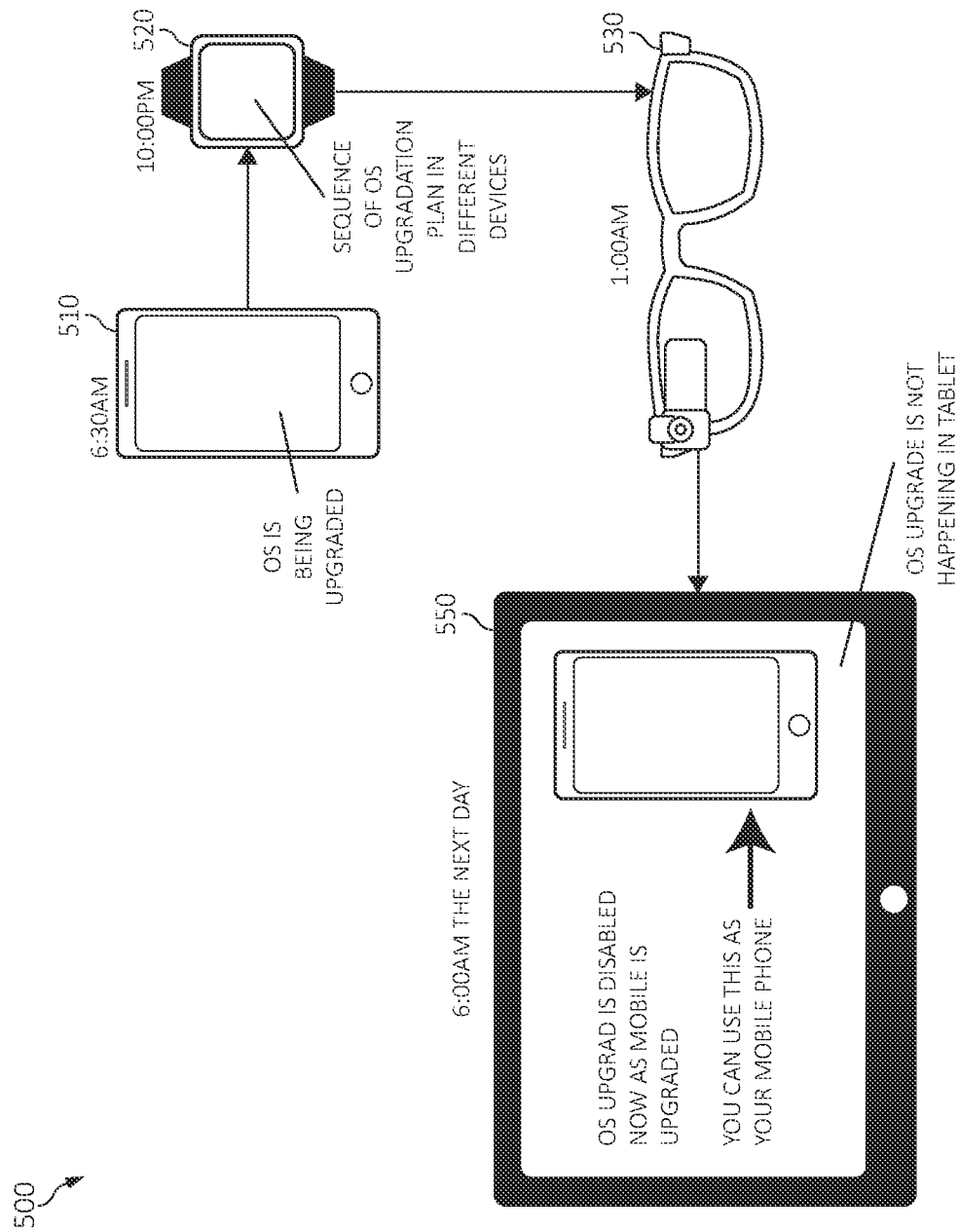
FIG. 5 is a block diagram depicting an operation for upgrading an operating application in a multi-device ecosystem in a computing environment according to an embodiment of the present invention.

For further explanation, FIG. 5 is a block diagram 500 depicting an operation for upgrading an operating application in a multi-device ecosystem in a computing environment according to an embodiment of the present invention. In one aspect, one or more of the components, modules, services, applications, and/or functions described in FIGS. 1-4 may be used in FIG. 5. As will be seen, many of the functional blocks may also be considered "modules" or "components" of functionality, in the same descriptive sense as has been previously described in FIGS. 1-4. Repetitive description of like elements employed in other embodiments described herein is omitted for sake of brevity.

To illustrate, consider the following operations deployed in FIG. 5, that includes a multi-device ecosystem 500 (e.g., see also system 400 of FIG. 4) that may include a plurality of computing devices such as, for example, a computer 550, a smartphone 510, a smart watch 520, and smart glasses 530 (which may be collectively referred to herein as "devices 510, 520, 530, and 550"). In some implementations, in the multi-device ecosystem 500, each computing devices such as, for example, a computer 550, a smartphone 510, a smart watch 520, and smart glasses 530 may be identified uniquely, and the computing devices such as, for example, a computer 550, a smartphone 510, a smart watch 520, and smart glasses 530 may provide specific metadata to that is to be share among other devices.

The device specific metadata pertaining to each of the computing devices such as, for example, the computer 550, the smartphone 510, the smart watch 520, and the smart glasses 530 may be metadata relating to the types of device, dimension of the device, and/or current OS version of the device etc.

Each of the devices 510, 520, 530, and 550 may provide and identify usage information (e.g., ADL, CDL, or other usage data). The usage data may indicate how long a user uses any device, timing data such as, for example, when a user looks at the device, the various types of activities the user is using the devices 510, 520, 530, and 550 for, and/or what types of activities the user is performing with the devices 510, 520, 530, and 550.

The multi-device ecosystem (e.g., the collaboration service 410 of FIG. 4) may identify the OS installed in the different devices 510, 520, 530, and 550, or what is the version of OS is on each of the devices 510, 520, 530, and 550, and will also predict how long the devices 510, 520, 530, and 550 each need for upgrading the OS installed thereon and predict the potential downtime of each of the devices 510, 520, 530, and 550 for upgrading the OS installed thereon.

In some implementations, available space and power in each of the devices 510, 520, 530, and 550 may be determined and validated along with which of the devices 510, 520, 530, and 550 require or need OS upgradation.

In some implementations, the multi-device ecosystem 500 may be considered as a cluster of devices where each of the devices 510, 520, 530, and 550 collaborate with each other by sharing information without any explicit authentication.

The multi-device ecosystem 500 (e.g., the collaboration service 410 of FIG. 4) may provide a remote server (e.g., computer 12 of FIG. 1) to identify each of the devices 510, 520, 530, and 550 OS upgradation needs and requirements.

The multi-device ecosystem 500 (e.g., using the collaboration service 410 of FIG. 4) may analyze the OS upgradation need among the devices 510, 520, 530, and 550 and may share device and usage specific information with each of the devices 510, 520, 530, and 550.

The participating devices 510, 520, 530, and 550 will be identifying how each of the other devices 510, 520, 530, and 550 are being used by a user, which may include the types of activities, types of information viewed consume by a user of the devices 510, 520, 530, and 550.

Based on the device usage data, the multi-device ecosystem 500 (e.g., using the collaboration service 410 of FIG. 4) may identify what types of activities the user will be doing in future timelines.

Based on the predicted activities of the user in future timeframe, the multi-device ecosystem 500 (e.g., using the collaboration service 410 of FIG. 4) may identify how different devices 510, 520, 530, and 550 will be involved in different activities.

The multi-device ecosystem 500 (e.g., using the collaboration service 410 of FIG. 4) may identify how the devices 510, 520, 530, and 550 will be used for future timeline, and will be prioritizing the devices 510, 520, 530, and 550.

The multi-device ecosystem 500 (e.g., using the collaboration service 410 of FIG. 4) may predict what types of difficulties a user experience if any devices 510, 520, 530, and 550 are not available for the scheduled or assigned OS upgradation time.

The multi-device ecosystem 500 (e.g., using the collaboration service 410 of FIG. 4) may identify and schedule the appropriate sequence of OS upgrade for each of the devices 510, 520, 530, and 550 so that predicted lowest usage device can be considered for OS upgrade.

Based on the device usage need, and duration of device required, the multi-device ecosystem 500 (e.g., using the collaboration service 410 of FIG. 4) may identify how the devices 510, 520, 530, and 550 will be sequenced for OS upgrade.

Based on predicted timeline and duration of device upgrade, the multi-device ecosystem 500 (e.g., using the collaboration service 410 of FIG. 4) may identify what information or functionalities the user may be required while the device is being upgraded.

When any of the devices 510, 520, 530, and 550 is about to start, the candidate device (e.g., one of the devices 510, 520, 530, and 550) may transfer any required data and information, and a user interface (of the device performing the OS upgrade) to the available devices (e.g., one of the devices 510, 520, 530, and 550) so that a user can use the available devices (e.g., one of the devices 510, 520, 530, and 550) during that time. It should be noted that transferring the user interface ("UI") means, an OS image of different device is provided, and along with the data and information, the OS image will also be transferred to an alternative device so that while accessing the primary device that is being upgraded (e.g., the mobile device activity on the a table), the user can view the device screen of the primary device that is being upgraded.

The participating device (e.g., one of the devices 510, 520, 530, and 550) may indicate, communicate, and/or provide a plan of OS upgrade in the other different devices (e.g., one of the devices 510, 520, 530, and 550), and will also be showing a sequence of device upgrade and how the device (e.g., one of the devices 510, 520, 530, and 550) may function as a backup of the device to the device being upgraded. When any one or more of the devices (e.g., one of the devices 510, 520, 530, and 550) are being upgraded as per the multi-device ecosystem plan, the other devices (e.g., one of the devices 510, 520, 530, and 550) are prohibited from upgrading their respective OS/APP so as to avoid any unavailability.

If a user or one of the devices (e.g., one of the devices 510, 520, 530, and 550) schedules a change to the OS upgrade plan from one device to another device, then the multi-device ecosystem 500 (e.g., using the collaboration service 410 of FIG. 4) may replan, reschedule, or revise the device upgrade plan for one or more of the devices 510, 520, 530, and 550 so that user does not have any downtime window.

To further illustrate, FIG. 5 depicts that device 510 has an OS being upgraded at a scheduled time of 6:30 am. The device 520 is then then next device in the sequence of OS upgradation plan amongst the devices 510, 520, 530, and 550 in the multi-device ecosystem 500. The device 520 is scheduled for an OS upgrade at 10:00 pm, and then the device 530 is scheduled for an OS upgrade at 1:00 am, and finally the device 550 is scheduled for an OS upgrade at 6:00 am on the following day.

Accordingly, as depicted in FIG. 5, the OS of device 550 is disabled from being upgraded as the device 510 (e.g., a mobile phone) is being upgraded. However, while the device 510 is being upgraded, the device 550 functions as (or is a proxy for the device 510) device 510. That is, device 550 is identified as the device in the multi-device ecosystem 500 to function as the mobile device while the device 510 is being upgraded. In this way, the device 510 may be upgraded but the functionality of the device 510 is transferred or assigned to device 550 to operate as the mobile device for device 510. Thus, the activities of using a mobile device (e.g., the device 510) by a user is not interrupted since the device 550 is identified and activated to perform the features, functions, and activities of device 510 for a user.

Figure 6:
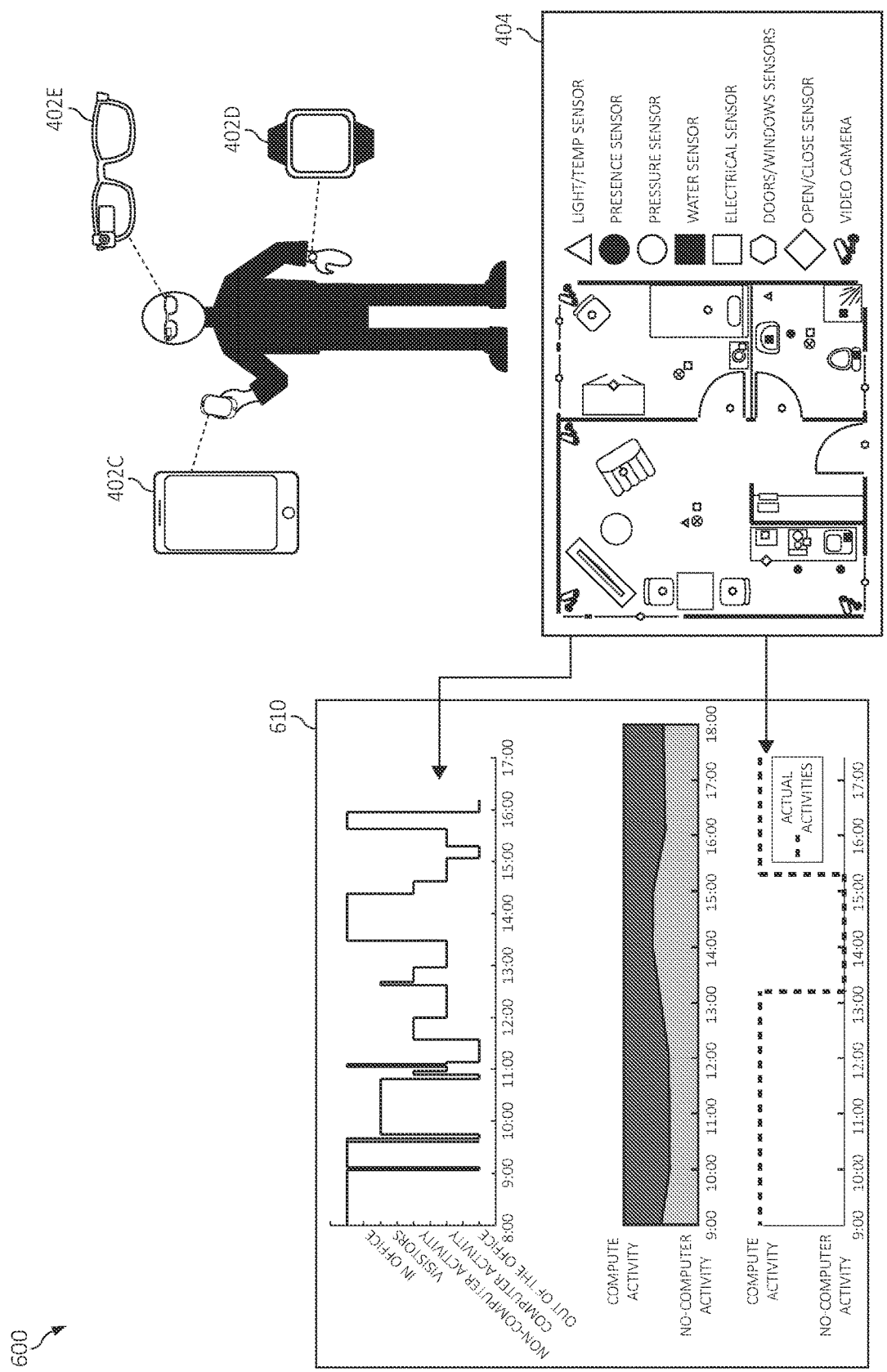
FIG. 6 is a block diagram depicting a daily activity results used for upgrading an operating application in a multi-device ecosystem in a computing environment according to an embodiment of the present invention.

FIG. 6 is a block diagram depicting a daily activity results used for upgrading an operating application in a multi-device ecosystem in a computing environment according to an embodiment of the present invention. In one aspect, one or more of the components, modules, services, applications, and/or functions described in FIGS. 1-4 may be used in FIG. 5. As will be seen, many of the functional blocks may also be considered "modules" or "components" of functionality, in the same descriptive sense as has been previously described in FIGS. 1-4. Repetitive description of like elements employed in other embodiments described herein is omitted for sake of brevity.

As depicted in FIG. 6, the graph 610 depicts the collaboration service 410 of FIG. 4 collecting, analyzing the various data and activities of the various devices in the system 600 (e.g., the system 400). The graph 610 depicts both computing device activity, computing device non-activity all of which may be data collected from the UEs 402A-E and IoT devices 404.

Figure 7:
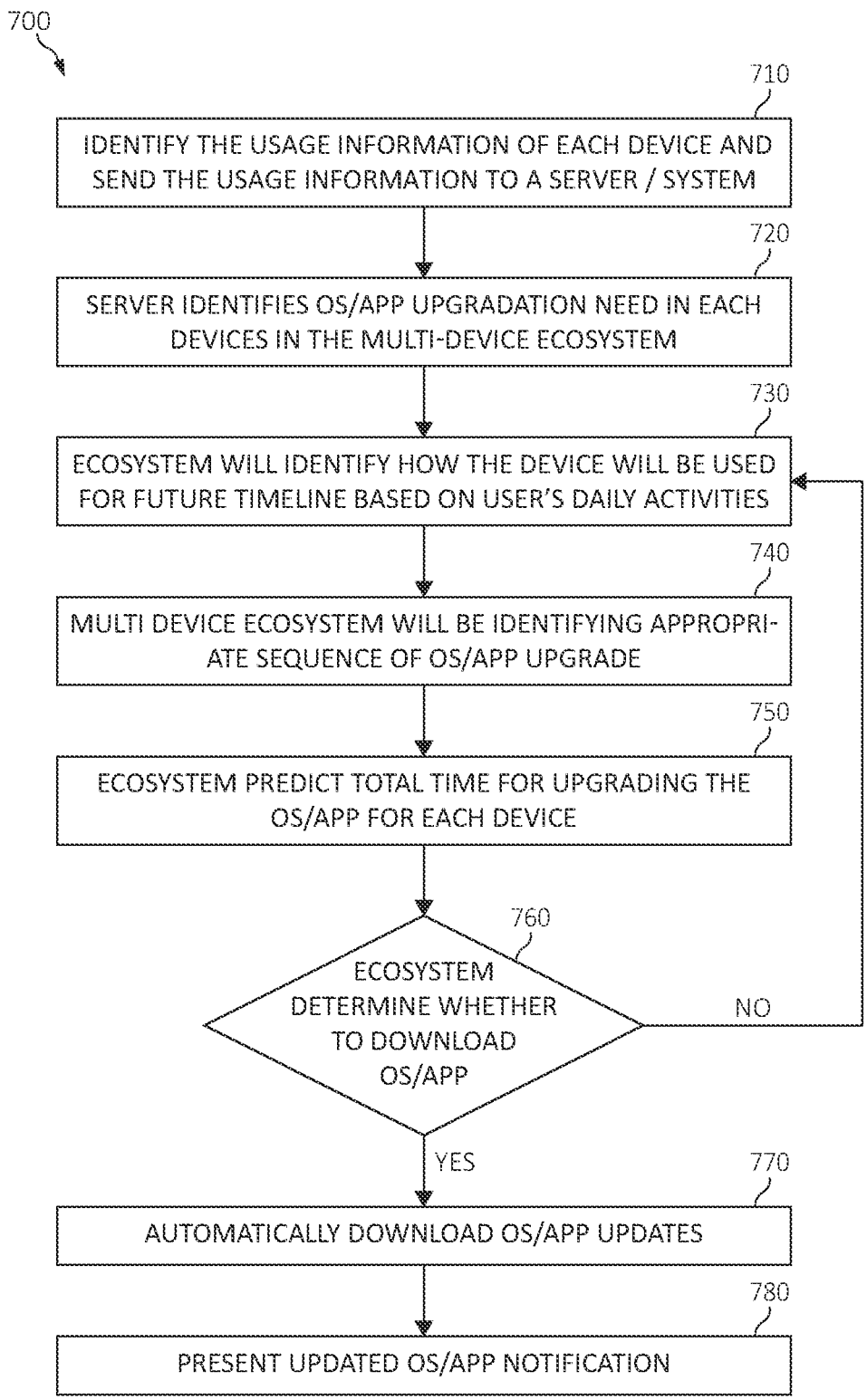
FIG. 7 is a flowchart diagram depicting an exemplary method for upgrading an operating application in a multi-device ecosystem in a computing environment according to an embodiment of the present invention.

Turning now to FIG. 7, a method 700 for upgrading operating application in a multi-device ecosystem using at least a portion of one or more processors is depicted, in which various aspects of the illustrated embodiments may be implemented. The functionality 700 may be implemented as a method executed as instructions on a machine, where the instructions are included on at least one computer readable medium or one non-transitory machine-readable storage medium. In one aspect, the functionality, operations, and/or architectural designs of FIGS. 1-6 may be implemented all and/or in part in FIG. 7.

In some implementations, usage information of each device in a multi-device ecosystem may be identified (e.g., identified by one or more devices) and the usage information may be sent/communicated to a server/computing system, as in block 710.

An OS/application upgradation may be identified of each device in a multi-device ecosystem, as in block 720. The method/manner in which each device will be used for future/subsequent activities may be identified (e.g., identified via the multi-device ecosystem) based on a user's daily activities, as in block 730.

An appropriate sequence of the operating system ("OS")/application ("APP") upgrade operations for each of device in the multi-device ecosystem may be identified, as in block 740.

A total time for upgrading the OS/APP for each of a plurality of devices may be predicted, as in block 750. An operation may be executed to determine whether to download the OS/APP, as in block 760. If no, the method 700 moves to block 730. If yes, the method 700 moves to block 770 and one or more updates to the OS/APP may be automatically downloaded. A notification indicating the OS/APP is updated is sent (e.g., sent to each device in the ecosystem), as in block 780.

Figure 8:
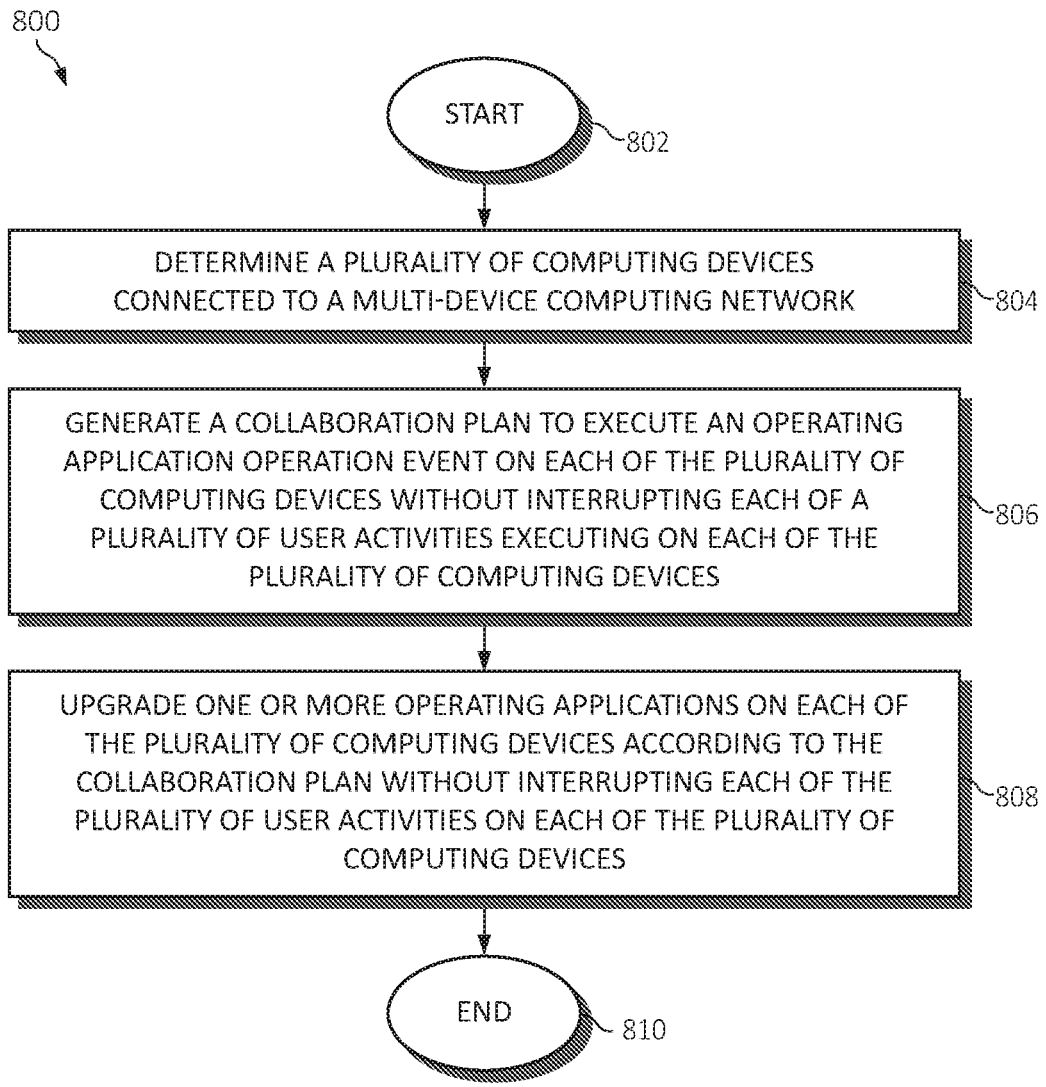
FIG. 8 is a flowchart diagram depicting an additional exemplary method for upgrading an operating application in a multi-device ecosystem in a computing environment according to an embodiment of the present invention.

Turning now to FIG. 8, a method 800 for upgrading operating application in a multi-device ecosystem using at least a portion of one or more processors is depicted, in which various aspects of the illustrated embodiments may be implemented. The functionality 800 may be implemented as a method executed as instructions on a machine, where the instructions are included on at least one computer readable medium or one non-transitory machine-readable storage medium. In one aspect, the functionality, operations, and/or architectural designs of FIGS. 1-8 may be implemented all and/or in part in FIG. 8. The functionality 800 may start in block 802.

Various types of computing devices are determined to be connected to a multi-device computing network, as in block 804. A collaboration plan is generated between the computing devices to execute an operating application operation event on each of the computing devices without interrupting user activities executing on each of the computing devices, as in block 806. Operating applications on each of the computing devices are upgraded according to the collaboration plan without interrupting each of the f user activities on each of the computing devices, as in block 808. The functionality 800 may end, as in block 810.

In one aspect, in conjunction with and/or as part of at least one block of FIGS. 7-8, the operations of methods 700 and 800 may include each of the following. The operations of methods 700 and 800 may collect usage data from each of the plurality of computing devices connected to the multi-device computing network, wherein each of the plurality of computing devices are an internet of things ("IoT") devices in an IoT network.

The operations of methods 700 and 800 may identify upgrade requirements for each of the one or more operating applications on each of the plurality of computing devices. The operations of methods 700 and 800 may predict a type of usage of each of the plurality of computing devices based on current usage and activity levels of each of the plurality of computing devices.

The operations of methods 700 and 800 may prioritize each of the one or more operating applications according to the collaboration plan; upgrade the one or more operating applications on each of the plurality of computing devices according to the prioritizing; and prevent alternative ones of the plurality of computing devices from upgrading while upgrading an operation application on a selected one of the plurality of computing devices.

The operations of methods 700 and 800 may provide access to alternative ones of the plurality of computing devices while upgrading an operation application on a selected one of the plurality of computing devices. The operations of methods 700 and 800 may initialize a machine learning mechanism for: collecting feedback information from the plurality of computing devices to assign, modify, update, or alter the one or more operating applications on each of the plurality of computing devices; learning the relationships and activities between the each of the plurality of computing devices and one or more users associated with each of the plurality of computing devices; and modifying the collaboration plan for upgrading the one or more operating applications on each of the plurality of computing devices.

The operations of methods 700 and 800 may initialize a machine learning mechanism for: collecting feedback information from the plurality of computing devices to assign, modify, update, or alter the one or more operating applications on each of the plurality of computing devices; and learning the relationships and activities between the each of the plurality of computing devices and one or more users associated with each of the plurality of computing devices.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for upgrading an operating application in a multi-device ecosystem in a computing environment by a processor, comprising:
    based on relationships and activities between a plurality of computing devices connected to a multi-device computing network, executing an upgrade operation on each of the plurality of computing devices without interrupting the activities executing on each of the plurality of computing devices, wherein executing the upgrade operation further comprises,
        upgrading one or more operating applications on a computing device from the plurality of computing devices during a time slot where the activities are not performed and when a user is not engaged in any activity on the computing device based on tracked user activity, and
        based on an activity performed during the time slot on the computing device, executing the upgrade operation in a sequence such that, while the one or more operating applications are being upgraded on the computing device, the activity from the computing device and data associated with the activity is replicated and performed on at least one available computing device not currently being upgraded from the plurality of computing devices to prevent the activity from being interrupted.

2. The method of claim 1, further including collecting usage data from each of the plurality of computing devices connected to the multi-device computing network, wherein each of the plurality of computing devices are an internet of things ("IoT") devices in an IoT network.

3. The method of claim 1, further including identifying upgrade requirements for each of the one or more operating applications on each of the plurality of computing devices.

4. The method of claim 1, further including predicting a type of usage of each of the plurality of computing devices based on current usage and activity levels of each of the plurality of computing devices.

5. The method of claim 1, further including:
    prioritizing the one or more operating applications;
    upgrading the one or more operating applications on each of the plurality of computing devices according to the prioritizing; and
    preventing alternative ones of the plurality of computing devices from upgrading while upgrading the operation application on a selected one of the plurality of computing devices.

6. The method of claim 1, further including providing access to alternative ones of the plurality of computing devices while upgrading the operation application on a selected one of the plurality of computing devices.

7. The method of claim 1, further including initialize a machine learning mechanism for:
    collecting feedback information from the plurality of computing devices to assign, modify, update, or alter the one or more operating applications on each of the plurality of computing devices;
    learning the relationships and activities between the each of the plurality of computing devices and one or more users associated with each of the plurality of computing devices; and
    modifying upgrading the one or more operating applications on each of the plurality of computing devices.

8. A system for upgrading an operating application in a multi-device ecosystem in a computing environment, comprising:
    one or more computers with executable instructions that when executed cause the system to:
        based on relationships and activities between a plurality of computing devices connected to a multi-device computing network, executing an upgrade operation on each of the plurality of computing devices without interrupting the activities executing on each of the plurality of computing devices, wherein executing the upgrade operation further comprises,
        upgrading one or more operating applications on a computing device from the plurality of computing devices during a time slot where the activities are not performed and when a user is not engaged in any activity on the computing device based on tracked user activity, and
            based on an activity performed during the time slot on the computing device, executing the upgrade operation in a sequence such that, while the one or more operating applications are being upgraded on the computing device, the activity from the computing device and data associated with the activity is replicated and performed on at least one available computing device not currently being upgraded from the plurality of computing devices to prevent the activity from being interrupted.

9. The system of claim 8, wherein the executable instructions when executed cause the system to collect usage data from each of the plurality of computing devices connected to the multi-device computing network, wherein each of the plurality of computing devices are an internet of things ("IoT") devices in an IoT network.

10. The system of claim 8, wherein the executable instructions when executed cause the system to identify upgrade requirements for each of the one or more operating applications on each of the plurality of computing devices.

11. The system of claim 8, wherein the executable instructions when executed cause the system to predict a type of usage of each of the plurality of computing devices based on current usage and activity levels of each of the plurality of computing devices.

12. The system of claim 8, wherein the executable instructions when executed cause the system to:
prioritize the one or more operating applications;
upgrade the one or more operating applications on each of the plurality of computing devices according to the prioritizing; and
prevent alternative ones of the plurality of computing devices from upgrading while upgrading the operation application on a selected one of the plurality of computing devices.

13. The system of claim 8, wherein the executable instructions when executed cause the system to provide access to alternative ones of the plurality of computing devices while upgrading the operation application on a selected one of the plurality of computing devices.

14. The system of claim 8, wherein the executable instructions when executed cause the system to initialize a machine learning mechanism for:
collecting feedback information from the plurality of computing devices to assign, modify, update, or alter the one or more operating applications on each of the plurality of computing devices;
learning the relationships and activities between the each of the plurality of computing devices and one or more users associated with each of the plurality of computing devices; and
modifying upgrading the one or more operating applications on each of the plurality of computing devices.

15. A computer program product for upgrading an operating application in a multi-device ecosystem in a computing environment, the computer program product comprising:
one or more computer readable storage media, and program instructions collectively stored on the one or more computer readable storage media, the program instruction instructions comprising:
program instructions to, based on relationships and activities between a plurality of computing devices connected to a multi-device computing network, execute an upgrade operation on each of the plurality of computing devices without interrupting the activities executing on each of the plurality of computing devices, wherein executing the upgrade operation further comprises,
program instructions to upgrade one or more operating applications on a computing device from the plurality of computing devices during a time slot where the activities are not performed and when a user is not engaged in any activity on the computing device based on tracked user activity, and
program instructions to, based on an activity performed during the time slot on the computing device, execute the upgrade operation in a sequence such that, while the one or more operating applications are being upgraded on the computing device, the activity from the computing device and data associated with the activity is replicated and performed on at least one available computing device not currently being upgraded from the plurality of computing devices to prevent the activity from being interrupted.

16. The computer program product of claim 15, further including program instructions to identify upgrade requirements for each of the one or more operating applications on each of the plurality of computing devices.

17. The computer program product of claim 15, further including program instructions to predict a type of usage of each of the plurality of computing devices based on current usage and activity levels of each of the plurality of computing devices.

18. The computer program product of claim 15, further including program instructions to:
prioritize the one or more operating applications;
upgrade the one or more operating applications on each of the plurality of computing devices according to the prioritizing; and
prevent alternative ones of the plurality of computing devices from upgrading while upgrading the operation application on a selected one of the plurality of computing devices.

19. The computer program product of claim 15, further including program instructions to provide access to alternative ones of the plurality of computing devices while upgrading the operation application on a selected one of the plurality of computing devices.

20. The computer program product of claim 15, further including program instructions to initialize a machine learning mechanism for:
collecting feedback information from the plurality of computing devices to assign, modify, update, or alter the one or more operating applications on each of the plurality of computing devices;
learning the relationships and activities between the each of the plurality of computing devices and one or more users associated with each of the plurality of computing devices; and
modifying upgrading the one or more operating applications on each of the plurality of computing devices.

* * * * *